Feb. 5, 1946.  E. C. MYERS  2,394,252
FLUID REMOTE CONTROL DEVICE
Filed Oct. 16, 1941  3 Sheets-Sheet 1
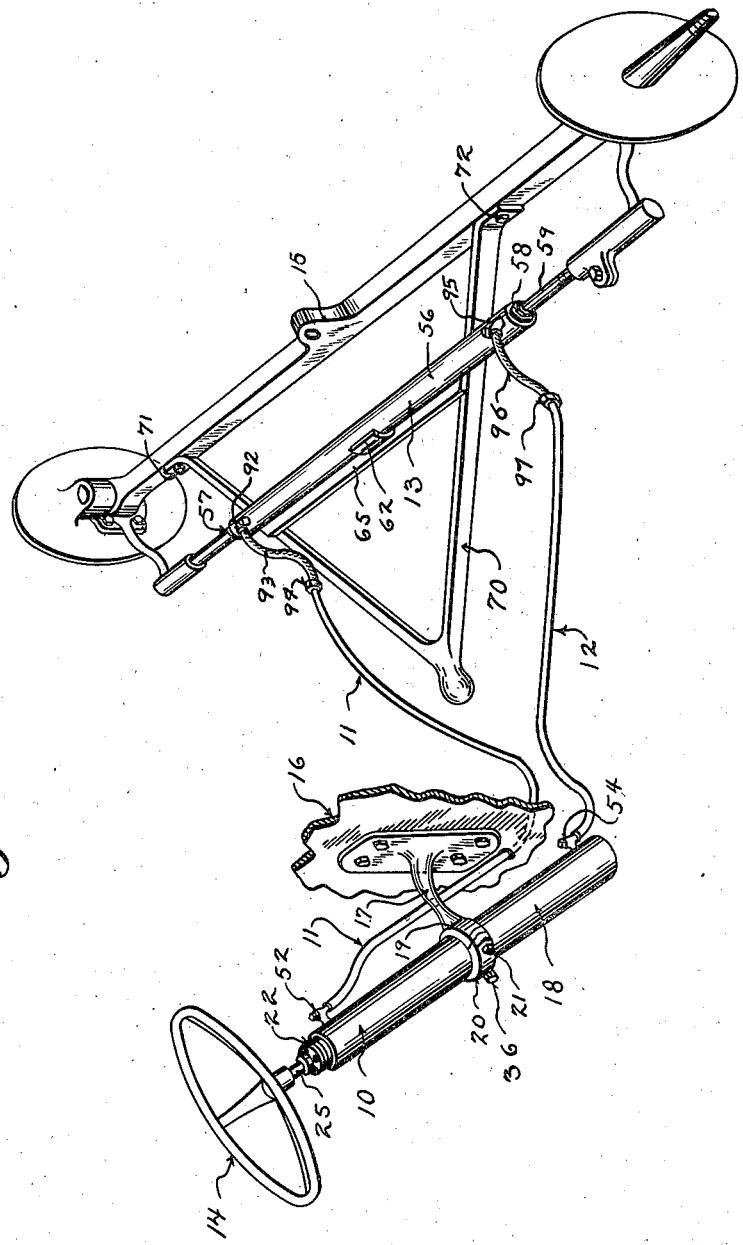
INVENTOR
Edward C Myers
BY
Emerson B Donnell
ATTORNEY Feb. 5, 1946. E. C. MYERS 2,394,252
FLUID REMOTE CONTROL DEVICE
Filed Oct. 16, 1941 3 Sheets-Sheet 2
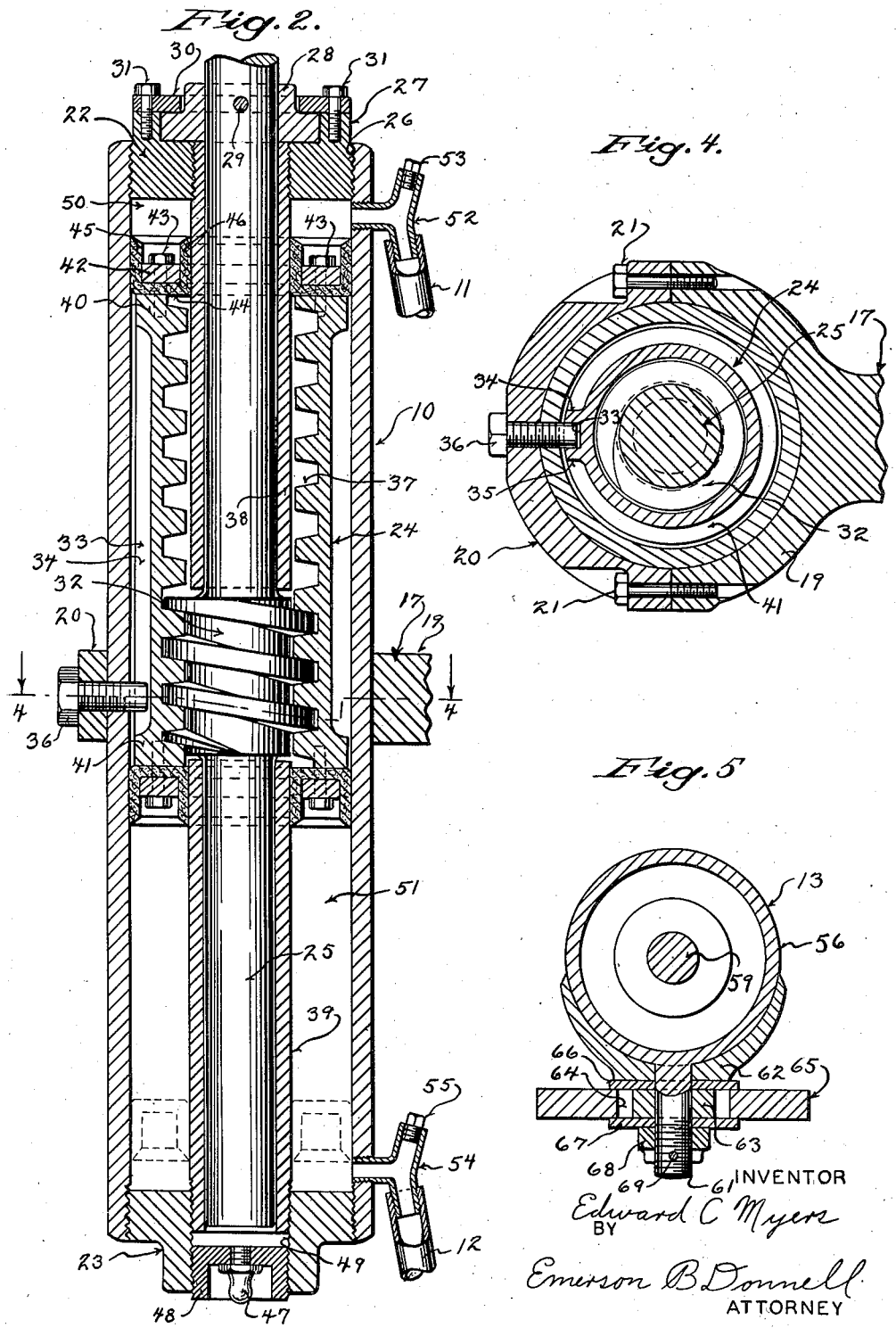
INVENTOR
Edward C Myers
BY
Emerson B Donnell
ATTORNEY

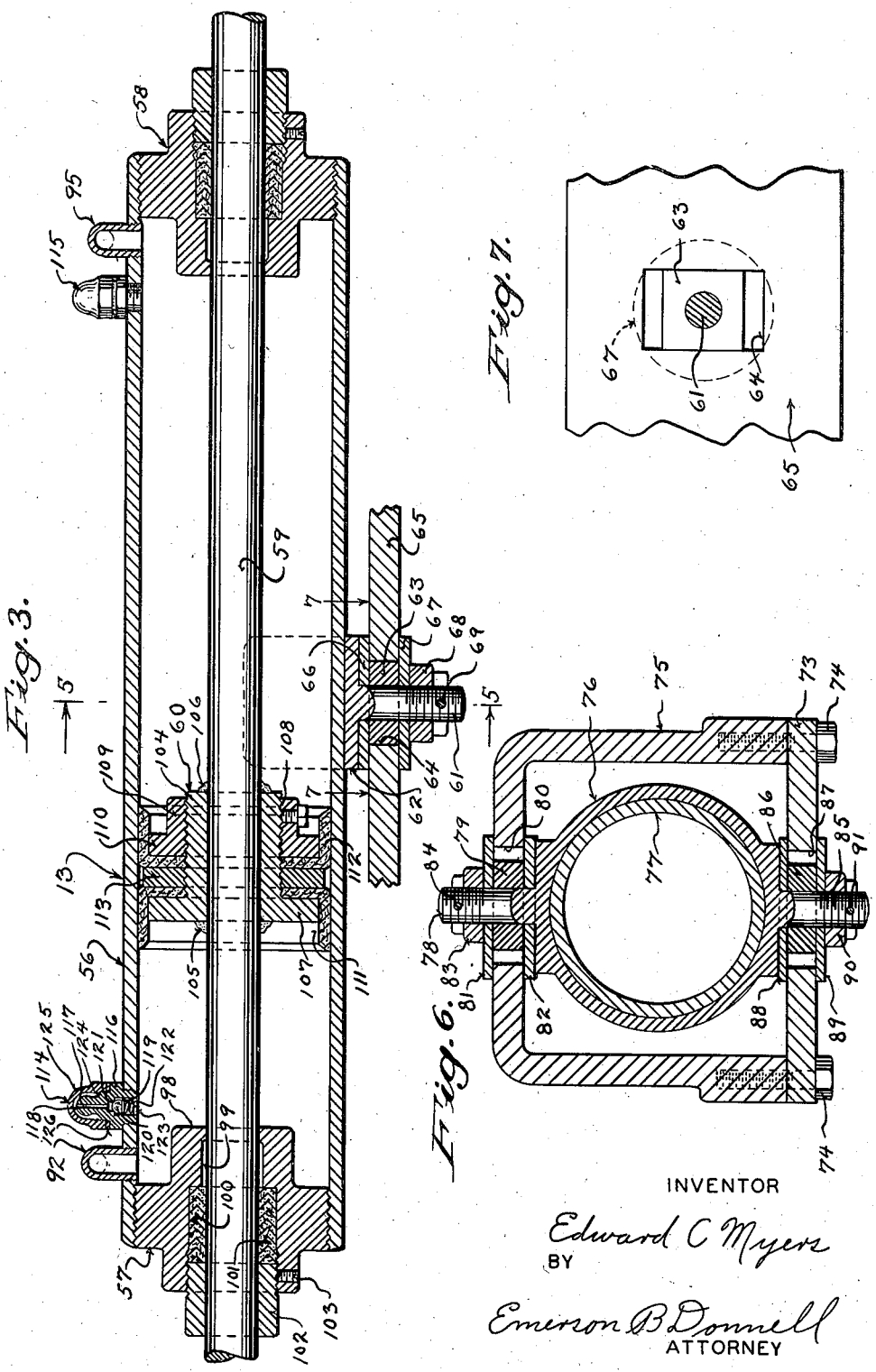

Patented Feb. 5, 1946

2,394,252

UNITED STATES PATENT OFFICE 2,394,252

FLUID REMOTE-CONTROL DEVICE

Edward C. Myers, Winnetka, Ill.

Application October 16, 1941, Serial No. 415,191

2 Claims. (Cl. 60—54.6)

The present invention relates to fluid driven actuating mechanism, and an object thereof is to generally improve the construction and operation of devices of this class.

A further object is to provide a fluid actuated remote control device of relatively high efficiency.

More particularly an object of the invention is to provide a steering gear which is actuated by fluid pressure. A further object is to provide a steering gear that is so constituted as to provide a direct and straight-line pressure on the parts thereof to avoid side-thrust and binding.

Further objects are to provide in a fluid actuated remote control a novel combination of fluid pressure producing means and fluid motor in which the two units may be spaced apart at a substantial distance without affecting the operation thereof; such a combination in which the only necessary connection between the pressure producing means and the motor consists of a pair of small tubes; such construction which is self-contained; an improved pump including an improved piston, packings, and piston actuating means; an improved motor; and expedients for accomplishing the above outlined objects.

A further object is to provide novel means for initially filling or loading such a system with fluid; for putting the fluid under an initial pressure; and for maintaining or restoring such pressure as necessary.

Similar reference characters have been applied to the same parts throughout the following specification and annexed drawings, in which:

Figure 1 is a perspective view of an embodiment of the invention, diagrammatic in character, and showing the device as applied to a steering gear, as, for example in a motor truck, tractor, or other vehicle.

Fig. 2 is a longitudinal sectional view of certain pump mechanism indicated in Fig. 1.

Fig. 3 is a similar view of motor mechanism indicated in Fig. 1.

Fig. 4 is a sectional view taken on the line 4—4 of Fig. 1.

Fig. 5 is a sectional view taken on the line 5—5 of Fig. 3.

Fig. 6 is a similar view of a modification of the construction shown in Fig. 5.

Fig. 7 is a horizontal sectional view taken on the line 7—7 of Fig. 3.

As seen in Fig. 1, the illustrative embodiment of the invention includes a pump or pressure producing unit generally designated as 10, connected, as by tubes or other conduits 11 and 12 with a motor unit generally designated as 13, in the present instance the pump being actuated by the steering wheel 14 of a motor vehicle, and the motor actuating the steering linkage ordinarily associated with the front axle 15 of the vehicle. The pump unit is supported, for example, from the dash board 16 of the vehicle by means of a bracket 17, or from any other convenient portion of the vehicle within the contemplation of the invention.

It is to be understood that, while the invention is shown and described as relating to a steering gear for a vehicle, it is not intended to limit the invention to such use, it being contemplated that the invention will be adaptable to any situation where it is desired to actuate a movable member at a distance from a control station, or in fact in any location, particularly where there is substantial resistance to be overcome and relatively high efficiency in the control is desirable to minimize manual effort on the part of the operator.

Returning to the pump or pressure producing unit, in the present illustrative embodiment this comprises a cylinder portion 18 which is clamped in a clamping portion 19 of above mentioned bracket 17, as for example by a cap 20, fixed with portion 19 by screws or the like 21, although it is contemplated that other means of suitable or well-known type may be used for securely supporting the cylinder within the purview of the invention.

Cylinder 18, as more particularly shown in Fig. 2, is closed at its ends by heads 22 and 23, and a piston generally designated as 24 is slidably arranged in the cylinder and is moved axially therein by rotation of a shaft 25 as will appear.

Head 22 is in the present instance, although not necessarily, threaded and engaged with cylinder 18 at 26 and has a rim portion 27 enclosing a collar, flange or thrust element 28 fixed with shaft 25 as by a pin 29. Collar 28 is retained within rim 27 by a ring 30, which in turn is retained against rim 27 by screws or other suitable fastening means 31—31. The dimensions are so chosen that head 22, flange 28, rim 27, and ring 30 constitute a form of thrust bearing providing for free rotation of shaft 25, but preventing appreciable axial movement thereof.

Shaft 25 in the present instance has above mentioned steering wheel 14 fixed therewith and accordingly is rotated by the wheel. Shaft 25 extends into cylinder 18 and has a threaded portion 32 for actuating piston 24, the thread being preferably, although not necessarily, of the type having an outwardly tapering cross section, such for example as the well-known "Acme" thread.

Piston 24 is made in the present instance in elongated form, having a length somewhat in excess of the desired piston stroke. It has an internally threaded portion or element so as to be reciprocated by the rotation of shaft 25 and threaded portion 32, and is provided with means to prevent rotation of the piston and threaded element with shaft 25, in the present instance consisting of a channel 33, formed as more particularly shown in Fig. 4, between ribs 34 and 35. Channel 33 in the present instance is engaged by a stud or finger 36 anchored in any suitable manner in cap 20. The fit between stud 36 and channel 33 may be as close as necessary to allow free axial movement of the piston while preventing appreciable rotation thereof.

It is contemplated that anti-friction expedients of suitable or well-known form may be substituted for thrust bearings 28, 30, etc., or channel 33 and stud 36, or both, without departing from the scope and spirit of the invention.

It will now be apparent that a construction has been provided in which all material loads are in an axial direction so that there is no appreciable tendency toward deflection or springing of the parts to cause misalignment, binding in the threads or bearings, or the like, common to many types of manually actuated steering gears, for example. The axial load, owing to the tapered configuration of the threads on portion 32, will tend to center this portion correctly in the internal threads 37 of piston 24, so as to give the proper thread clearance, both at the top and root, and a true bearing between the working faces. A manually operated gear is thus provided which is both highly efficient, and relatively inexpensive to manufacture.

In remote control gears of this general type it is important that leakage of the actuating fluid be virtually eliminated, and the construction of the necessary packing, therefore, is a matter for consideration. Packings for pistons in fluid actuated or hydraulic brakes, rams, controls, etc., are generally well-known, but in the present instance, as seen in Fig. 2, provision is made to isolate the packing from rotatable shaft 25. Thus, head 22 has a sleeve 38 projecting therefrom axially of cylinder 18, and, in similar manner head 23 has a sleeve 39 projecting, also axially, toward sleeve 38. These sleeves approach each other approximately at the center of cylinder 18, but are spaced sufficiently to receive threaded portion 32 between them. Sleeves 38 and 39 accommodate shaft 25 with the desired amount of clearance, preferably, although not necessarily with running clearance merely, forming a long bearing for shaft 25 to support it against springing under side thrust developed in wheel 14. It is contemplated that greater clearance may be provided, however, and the side thrust accommodated in other well-known or suitable bearing means within the scope of the invention. As above noted, binding will be practically eliminated by the self-centering tendency of the threads on portion 32.

Piston 24 has head portions 40 and 41 constituting the ends of the piston and supporting the packings, it being necessary to describe only one, since the packings are preferably identical on the two ends. Head portion 40 has a ring 42 supported from or connected with head portion 40 by screws or the like 43—43, and retaining between itself and the head a packing element 44 having extension flanges 45 and 46.

Flange 45 fits within the bore of cylinder 18 and prevents leakage of fluid between itself and the cylinder, while flange 46 fits about sleeve 38 and prevents leakage between itself and the sleeve. In this manner the packing is subjected only to linear motion as piston 24 moves, and is thus subjected to less wear than would be the case if it bore directly on rotating shaft 25.

In instances where a packing such as 46 contacted a rotating shaft, as 25, the almost imperceptable tool marks on the shaft have been found to act as a screw pump when the shaft rotated, and to actually propel the fluid through the joint intended to be made fluid-tight by the packing. This action is avoided in the present construction by allowing only linear movement between the packing and sleeve 38. The packed joint then remains substantially perfectly tight, and there is no appreciable loss of fluid.

Although various suitable types of packings are contemplated, in the preferred form illustrated flanges 45 and 46 are forced outwardly and inwardly, respectively, by any fluid pressure developed in cylinder 18 between head 22 and ring 42, so as to be forced against the sealing surfaces of the cylinder and sleeve 38 with a pressure which varies in accordance with the fluid pressure, and therefore in accordance with the required sealing pressure.

Lubrication of threads 32 and 37 is preferably effected by introducing a quantity of lubricant into the space between thread 37 and sleeves 38 and 39, and this may be replenished at any time through the clearance between the shaft 25 and the sleeves 38 and 39. For convenience a suitable or well-known type of fitting or nipple 47 is applied, in the present instance, to a plug element 48 adapted to close the opening 49 in plug 23 which receives sleeve 39. A suitable or well-known type of pressure lubricator or gun applied to fitting 47 will accordingly serve to fill the clearance spaces with lubricant.

The described construction results in pump chambers 50 and 51, which are alternately put in compression, upon reciprocating movement of plunger 24.

Chamber 50 in the present instance has a fitting 52 which is for convenience provided with a filler plug 53, the fitting being fastened in the wall of cylinder 18 in any suitable manner, and connecting with above mentioned tube 12, and chamber 51 has a fitting 54 having a filler plug 55 and preferably fastened in the wall of cylinder 18 in a similar manner and connected with above mentioned tube 11.

Pipes 11 and 12, as above explained, lead to a motor 13, in the present instance comprising a cylinder 56 closed at its ends by plug-like heads 57 and 58, threaded into or otherwise suitably fixed with cylinder 56, the joint being made fluid-tight in any suitable or preferred manner. Heads 57 and 58 constitute guides for a rod 59 arranged to actuate the mechanism to be controlled, and in the present instance constituting one of the rods of the steering mechanism of the vehicle, commonly known as the tie-rod. Rod 59 in the present instance has fastened to its mid-portion a piston generally designated as 60 and which is forced by the fluid pressure in one direction or the other in accordance with the direction in which the pressure of the fluid is imposed thereon. Rod 59 is moved by the piston and effects the desired adjustment or motion of the controlled mechanism.

The pressure on piston 60 induces a reaction on cylinder heads 57 and 58, tending to move the cylinder in a direction opposite to that of the piston and rod, and this, in the present instance, is resisted by a stud or pin 61, integral with or otherwise fixed with a pad or the like 62 welded or suitably fixed with cylinder 56 so as to be rigid therewith. Stud 61 extends downwardly and is journaled in a slide-block 63, slidable in a slot 64, Fig. 7, in a plate 65 which is adapted to support the weight of motor 13. Slot 64 is disposed transverse to above mentioned tie-rod 59, and accordingly allows for bodily movement of the motor to and from axle 15, but prevents movement in the direction of tie-rod 59. Angular movement of motor 13 is also provided by the journaling of stud 61 in block 63. Other suitable or well-known slide bearing constructions are contemplated as equivalent.

A washer 66 is preferably interposed between pad 62 and plate 65 to assist in imposing the weight of motor 13 on the plate, and a similar washer 67 is disposed below plate 65 and held in place by a nut 68, which may be of the castellated type, and prevented from loosening by a pin 69. In this manner a substantially straight-line thrust relation is set up between rod 59 and plate 65.

Plate 65, as more particularly shown in Fig. 1, is carried in the present instance by a radius rod structure 70, fixed with axle 15 as by bolts 71 and 72. In this manner tie-rod 59 is relieved of the weight of motor 13, but cylinder 56 is prevented from moving in a direction opposite to rod 59 by means substantially in line with the rod.

A construction is shown in Fig. 6 in which the holding means is completely centered with the rod so that all side thrust, or rocking tendency on the part of the motor is eliminated. Thus a plate 73, supported in a manner similar to above mentioned plate 65, or in any suitable manner has fixed therewith as by screws 74—74 a yoke 75, so as to be rigid with the plate, an attaching ring 76 being welded or otherwise suitably fixed with a cylinder 77. Ring 77 carries an upper stud 78 journaled in a slide block 79 slidable in a slot 80 in yoke 75, washers 81 and 82, and a nut 83 and pin 84 being applied to stud 78 in the same manner as in the case of above described stud 61. In like manner ring 76 carries a lower stud 85 journaled in a slide block 86 slidable in a slot 87 in plate 73, washers 88 and 89, and a nut 90 and pin 91 being used as above. Cylinder 75 thus rests on plate 73, but is supported against endwise movement both above and below, so that there is no reaction tending to cause endwise rocking thereof.

Other means for preventing undesired movement of motor cylinder 56 while permitting such freedom as may be necessary is contemplated as within the scope of the invention, which is not to be taken as limited by anything in this description.

Returning to a more comprehensive description of motor 13, cylinder 56 has a fitting 92 suitably fixed in the wall thereof, and to which is connected one end of a flexible tube or conduit 93, which is connected by means of a fitting 94 with above mentioned pipe 11. In the case of a sprung vehicle, tube 93 provides for relative movement between axle 15 and the body of the vehicle without excessive flexing of pipe 11. Substantially identical construction is used at the opposite end of cylinder 56, a fitting 95 being suitably fixed in the wall of cylinder 56 and connected with a flexible tube 96 which connects by means of a fitting 97 with above mentioned pipe 12. It is contemplated in unsprung vehicles, or in situations where there is little if any relative movement between motor cylinder 56 and pump cylinder 18 flexible conduits 93 and 96, together with their attaching fittings may be omitted, and pipes 11 and 12 attached directly to cylinder 56 as will be understood.

Head 57 has a boss 98 within cylinder 56 and which provides a bore 99 for the passage of rod 59. Bore 99 is enlarged at 100 to receive a packing 101 of any suitable type, but preferably of the multiple "Chevron" type which tends to seal itself with the necessary degree of tightness for the prevailing pressure. A packing nut 102 is threaded or otherwise suitably maintained in bore enlargement 100 and serves to retain packing 101 and provide additional bearing surface on rod 59. A set screw or the like 103 is provided in head 57 for maintaining the adjustment of nut 102.

Head 58 is preferably identical, and need not be further described.

Piston 60 may be of any suitable type, but in the present illustrative embodiment comprises a sleeve-like element 104 which is slidable on rod 59 and permanently located thereon in the desired position as by welding at 105 and 106. Portion 104 has a head or flange portion 107 and is externally threaded at 108. A nut portion 109 is threaded on sleeve 104 and has a flange portion 110 opposed to flange 107, and packings or "cup leathers" 111 and 112 are clamped between flanges 107 and 110, a metal or other suitable washer 113 being interposed to space the packings. Appreciable clearance preferably exists between washer 113 and cylinder 56 so that piston 60 is free to find its own center in the cylinder and avoid any binding as a result of unavoidable misalignment between the cylinder and rod 59.

It will be noted that there is no tendency toward sidewise displacement of the piston or rod due to the working pressure on the parts, so that a substantially straight-line thrust is effected, providing a motor of relatively high efficiency.

Such a motor coupled with a highly efficient pump unit, as above described, and applied as a steering gear to a heavy tractor required only a fraction of the effort at the steering wheel to perform the equivalent amount of steering effect on the front wheels, as did a conventional worm and sector steering gear. While all the factors entering into the comparison may not be known, it appears quite clearly that the important consideration is the lack of any binding in any of the parts caused by the working stresses. As above described, the parts of the present device tend toward more perfect alignment as the forces are applied, so that a surprisingly large percentage of the work applied to the steering wheel appears as useful work at the steering spindles, or other driven element.

The system may be charged with pressure fluid in any well-known manner, in the present instance by means of a high pressure "gun" of the type well-known for lubricating chassis bearings and the like. For this purpose fittings or nipples generally designated as 114 and 115 are provided and preferably inserted in the wall of cylinder 56 at any convenient points adjacent the respective ends thereof so that the chambers on either side of piston 60 may be filled independently. As is well-known, it is important to eliminate virtually all the air present in the system, when it is filled with the hydraulic fluid, and this may be accomplished in the disclosed structure as follows.

In the normal inclined position of the steering column, or in the present instance pump unit 10, with plunger 24 at the bottom, corresponding to a full right turn, chamber 51 will be much reduced in size, piston 24 being substantially contiguous with fitting 54. Fitting 54 therefore enters the reduced chamber 51 at substantially the highest point thereof. The tie rod 59 is placed in the extreme left turn position and the space at the right of piston 60 in motor 13 is filled through fitting 115, plug 55 being removed from fitting 54 so that the air in motor 13 may escape through fitting 95, pipe 12, and fitting 54. When the motor chamber is full, hydraulic fluid will fill pipe 12 and its connected parts and flow through fitting 54 into chamber 51 of pump 10, the air in the chamber escaping through the opening caused by the removal of plug 55. Note that at this stage the pump and motor are not in the proper relative position, motor 13 being in the extreme left turn position, while pump 10 is in the extreme right turn position. When all the air is expelled from pump chamber 51, plug 55 is replaced and hydraulic fluid is continued to be injected through fitting 115, while steering wheel 14 is turned toward the left to enlarge chamber 51. This procedure is continued until the pump plunger has been moved from its extreme right turn position to its extreme left turn position, chamber 51 then attaining the maximum size and being full of hydraulic fluid. At this point the pump and motor occupy their correct relative positions. The left-hand end of motor cylinder 56 is next filled with hydraulic fluid through fitting 114, the air escaping through the opening provided by the removal of plug 53 from fitting 52 in pump cylinder 18. When the left-hand chamber of motor 13 is full, hydraulic fluid will fill fitting 92 and pipe 11, flowing into chamber 50 through fitting 52, and the air in chamber 50 escaping also through fitting 52. After all the air has escaped, as indicated by a lack of bubbles at fitting 52, plug 53 is replaced, and additional fluid is preferably injected to put the system under an initial pressure. In this way all "slack" or lost motion in the hydraulic portion of the system is eliminated.

In case of slight leakage, more hydraulic fluid may be introduced at any time through either fitting 114 or 115, although, as is well-known, packings of the type disclosed are efficient enough to prevent virtually all leakage, so that any initial pressure will be retained for a substantial length of time.

It is contemplated that a suitable or well-known type of pressure "gun" or pump may be permanently connected into any convenient part of either or both of pipes 11 and 12, or the pump or motor chambers connected therewith, so that if slack develops the condition may be corrected immediately by a few strokes on the pumps. It is preferable to have two pumps, one for each set of chambers, since the repeated injection of fluid into one pump would tend to force motor piston 60 toward one side, and accordingly get it out of its proper relation with pump piston 24.

In order to positively hold the pressure fluid, fittings 114 and 115 are preferably of a special type, as clearly shown in Fig. 3, the fittings being alike, it being necessary to describe only one.

Fitting 114 comprises a body portion 116 having a bore 117 for receiving fluid from a "gun" applied to a seat portion 118. Bore 117 is enlarged at 119 to receive a ball or check valve 120 forced against a seat 121 by a spring 122 compressed between ball 120 and an abutment 123. Body portion 116 in the present instance has an externally threaded portion 124 with which is engaged a cap 125 which may be applied after the injecting operation is completed, to insure the retention of the hydraulic fluid by the fitting in spite of any imperfection in the seal effected by the check valve 120. Cap 125 may seat on a gasket 126 within the contemplation of the invention.

The operation of the above described structure is thought to be apparent from the above description, the chambers 50 and 51, pipes 11 and 12, and the spaces on either side of piston 59 being filled with pressure fluid as above described, rotating of wheel 14 turns shaft 25, screw 32, and, since plunger 24 is prevented from rotating by stud 36, forces the plunger to move axially of cylinder 18. Obviously rotation of wheel 14 in one direction will cause upward movement of plunger 24, while rotation in the opposite direction will cause downward movement of the plunger. Assuming downward movement, which would result from turning of wheel 14 for travel to the right in the illustrative construction, fluid will be compressed in chamber 51. Since the fluid ordinarily used is incompressible it is forced out through fitting 54 and pipe 12, entering cylinder 56 through flexible tube 96 and causing leftward movement, as seen in Figs. 1 and 3, of piston 60. This accomplishes the desired controlling movement of rod 95, and piston 60 in addition forces fluid from the left end of cylinder 56 out through flexible tube 68 and pipe 11 to chamber 50 of the pump unit to fill the space behind the retreating plunger 24.

In the present instance the proportions of the cylinders are so chosen that the volume of fluid forced back to one end of the pump will be exactly equal to the space vacated by the piston. This may be effected by making the two ends of each cylinder identical, or by making the corresponding ends of the pump and motor, namely, the ends which are connected by the pipes 11 and 12 and their connections, of equal ratio. Thus if the displacement of one end of the pump per unit of travel is, for example 1.5 times that of the end of the motor cylinder which is connected to it, the other end of the pump cylinder, while it need not be equal to the first end, is also 1.5 times the displacement of the other end of the motor cylinder. Under these conditions no provision need be made for any compensation for changes in volume of fluid caused by movement of the pistons.

In the present instance the shaft 25 and also the piston rod 59 have been run entirely through their respective cylinders, so that the above described relation is readily achieved. If it were desired not to run these members entirely through the cylinders, however, it could be readily done by making sure that the ends containing the members were connected together, and that those not having the members were connected together, the sizes of the members being so chosen as to maintain the same ratio of displacement, as above explained. It will be noted that, in the preferred structure disclosed the forces developed are substantially all axial, particularly those developed in the pumping unit, and that these forces and their reactions tend to center the plunger 24 on the threaded portion 32 so that the theoretical contacts between the threaded elements are closely achieved, and no appreciable side thrust is developed to cause binding between the plunger and cylinder. In similar manner very little side thrust is developed in motor cylinder 56, what there is being readily handled by the generous bearings which are readily provided in the shape of packing nuts 102. Furthermore in the embodiment of Fig. 6, even this is eliminated.

Such side pressure as is occasioned by the weight of the parts is considered negligible, in comparison to the actuating forces set up by the operation of the apparatus.

The self-aligning property of the disclosed structure results in an unusually high efficiency in the screw, so much so that it is possible in the actual embodiment to cause wheel 14 to spin by exerting an end thrust on rod 58. In view of this high efficiency it is contemplated that the controlling functions might be reversed, for certain applications, for example linear movement at one point could be caused to produce rotary movement at a remote point by reversing the functions of the motor and pump units. It is also contemplated that identical units, as two pumps such as 10 could be arranged at the ends of a system, movement imparted to one being substantially duplicated in the other. In like manner two units as 13 could be combined into a system and function in an analogous manner.

It is contemplated that variations on the disclosed construction will occur to one skilled in the art, and it is not intended to limit the invention to the device disclosed, or in fact in any manner, except as required by the appended claims.

The above being a complete description of an illustrative embodiment of the invention, what is claimed as new and desired to be secured by Letters Patent of the United States is:

1. In a fluid actuated apparatus a cylinder having heads, inwardly directed sleeves extending axially of the cylinder and approaching each other at the center of the cylinder, an actuating shaft within the sleeves and having a threaded part between the inner ends of the sleeves and of a diameter greater than the outer surfaces of the sleeves, an elongated hollow piston disposed about the sleeves and threaded part and bridging the space between the sleeves, said piston having an internally threaded bore of a size sufficient to pass outside of said sleeves, packings engaging the interior of the cylinder and the exterior of the sleeves to exclude piston actuated fluid from said threaded part, and said piston being engaged with said threaded part for axial movement upon rotation of said threaded part, and partially enclosing said sleeves, means for substantially preventing axial movement of the shaft and means for substantially preventing rotation of the piston.

2. In a pump unit for a fluid actuated control system a cylinder having heads, inwardly directed sleeves extending axially of the cylinder and approaching each other at the center of the cylinder, a piston in the cylinder of a length in excess of the desired piston stroke and having an internal thread characterized by an inwardly tapering cross section, and disposed within a bore in said piston of a size such that said internal thread can pass freely outside of said sleeves, an actuating shaft within the sleeves and having an enlarged externally threaded part between the inner ends of the sleeves and of a size to extend diametrically beyond the outer surfaces of said sleeves into engagement with said internal thread, the thread on said externally threaded part being characterized by an outwardly tapering cross section, a packing at either end of said piston to form with said cylinder and said sleeves a pair of displacement chambers, said bore bridging the space between the inner ends of the sleeves to exclude piston actuated fluid from said threads, said cylinder, said shaft and said piston being disposed substantially on a common center line whereby the tapering cross section of the threads of the shaft and piston will cause accurate centering of the piston and shaft and avoid deleterious distortion and binding of the parts, means for substantially preventing axial movement of the shaft and means for substantially preventing rotation of the piston.

EDWARD C. MYERS.